United States Patent Office 3,411,975
Patented Nov. 19, 1968

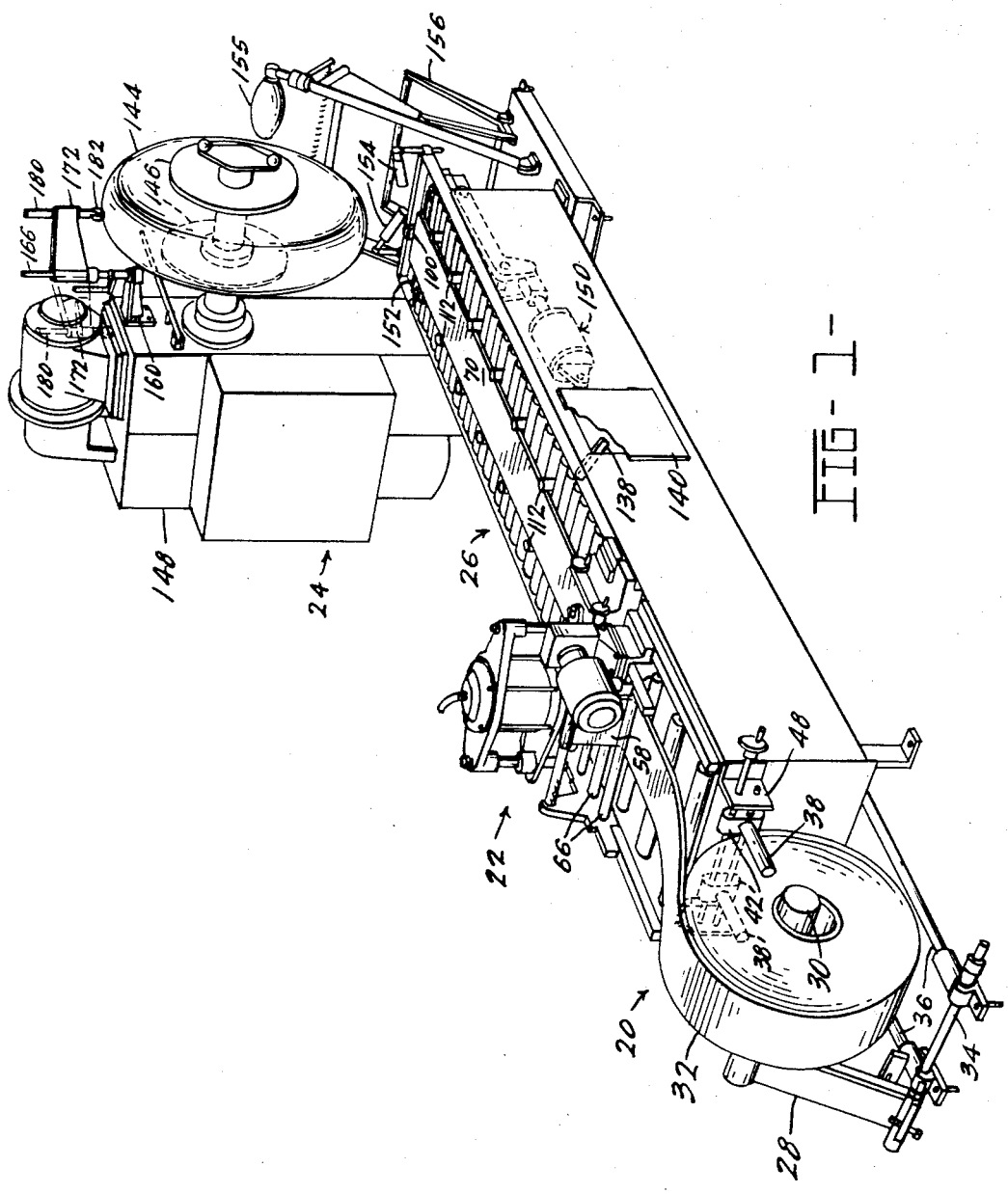

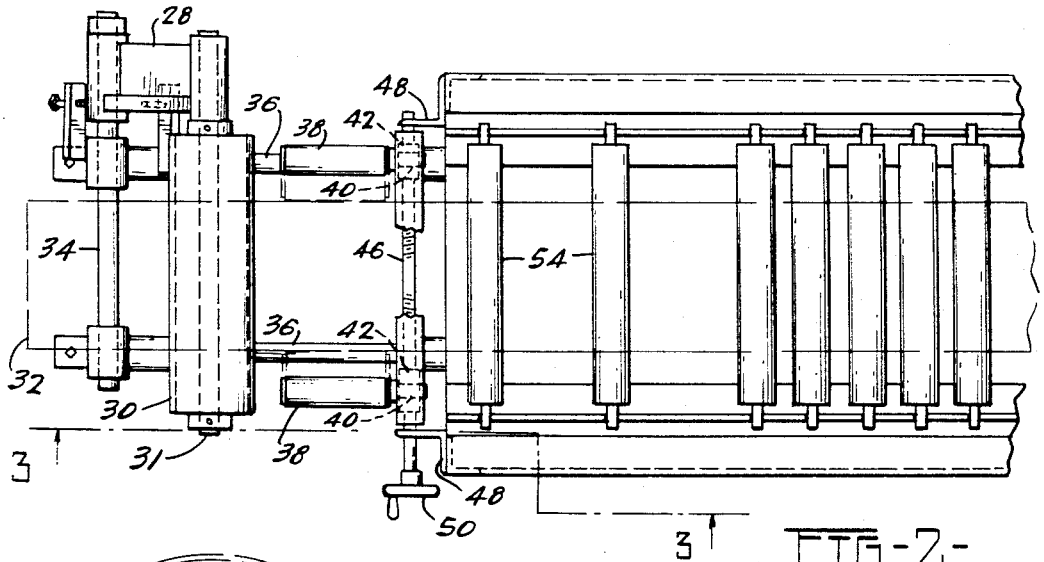
FIG-2-
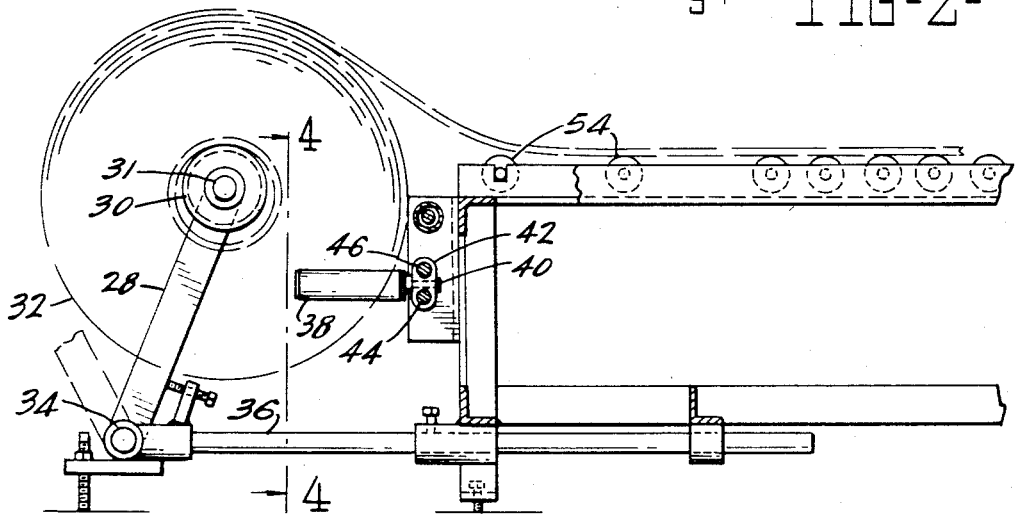
FIG-3-
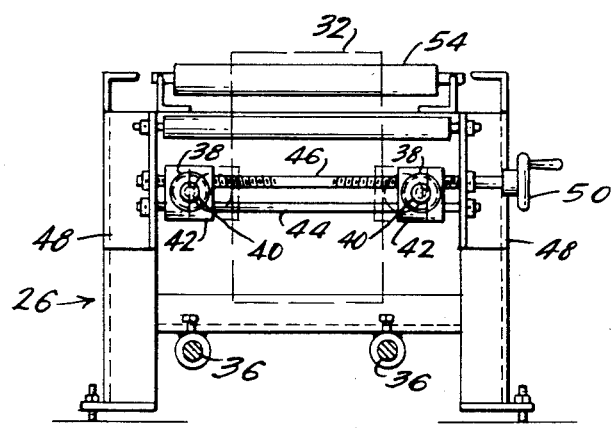
FIG-4-

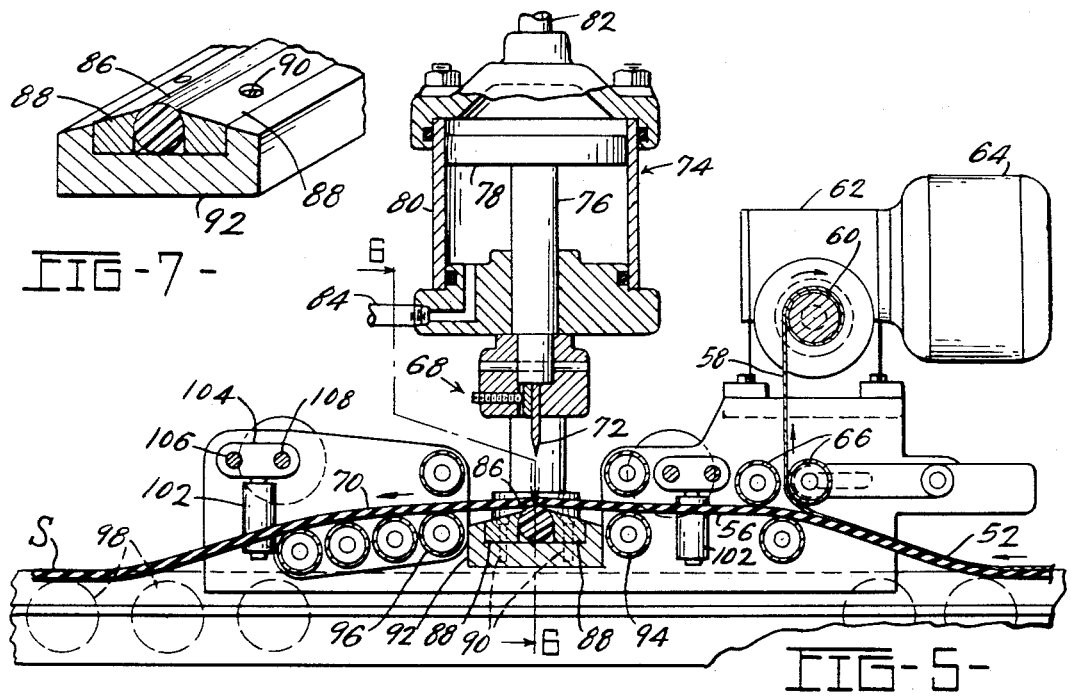
FIG-7-
FIG-5-
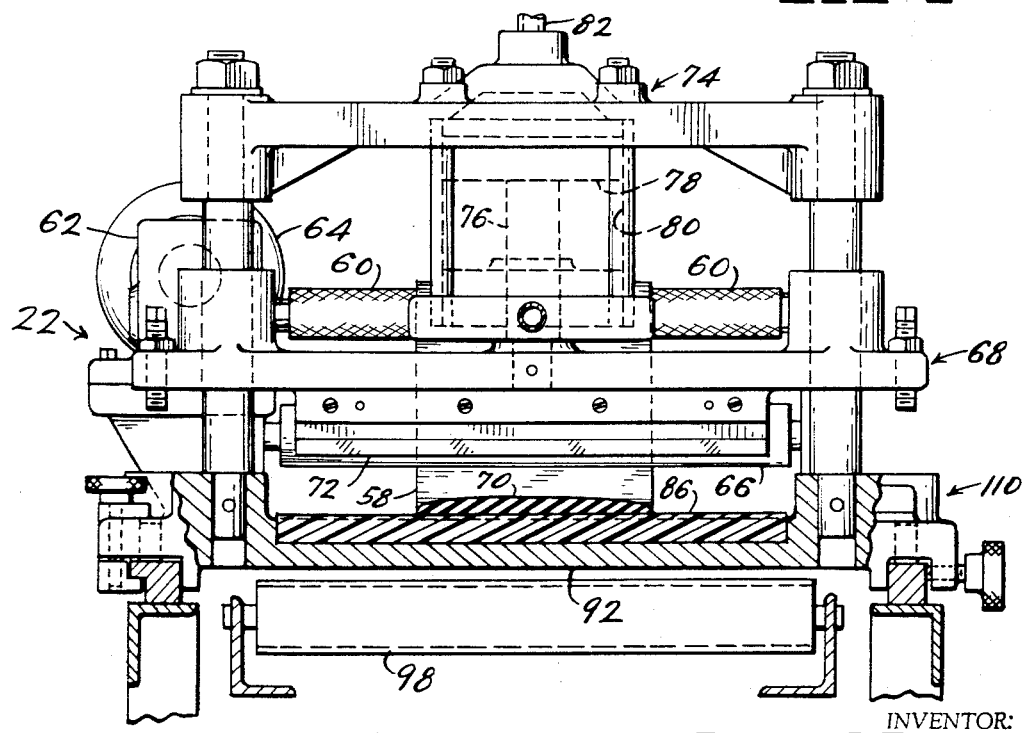
FIG-6-
INVENTOR:
RONALD C. ROWE.
BY
Owen + Owen
ATTYS.

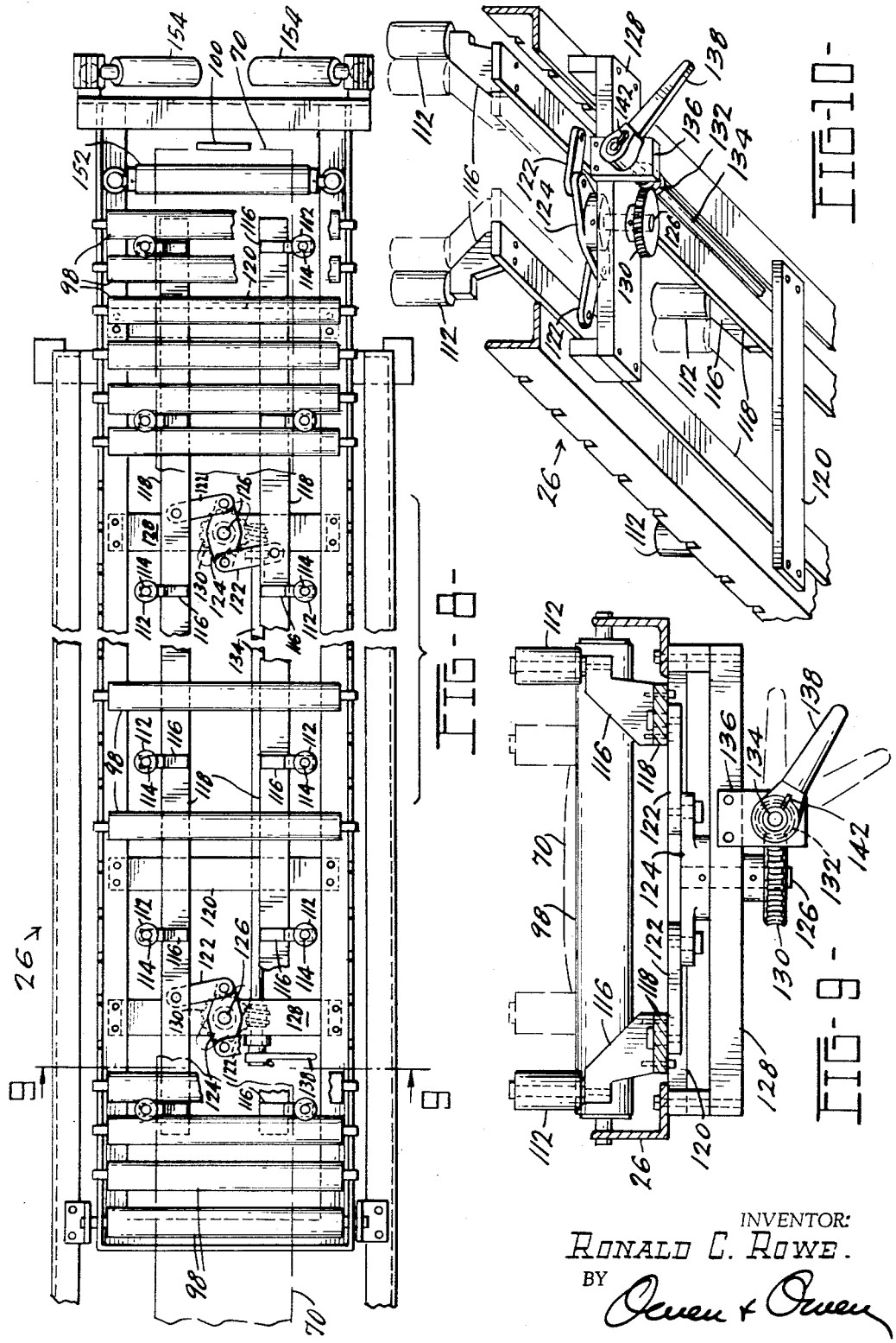

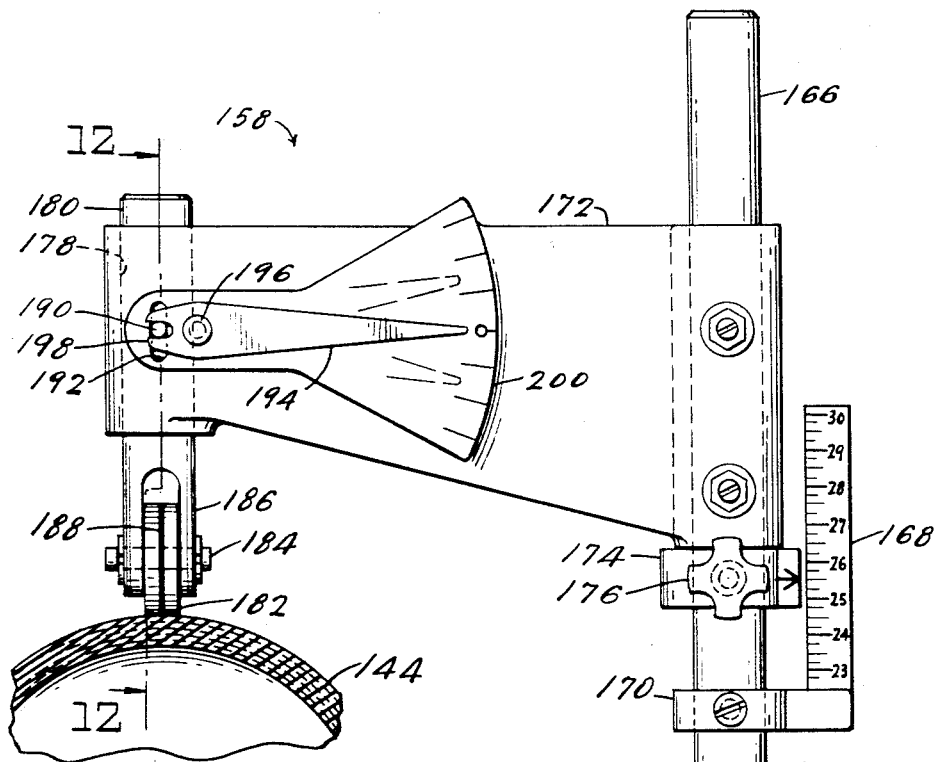
FIG-11-
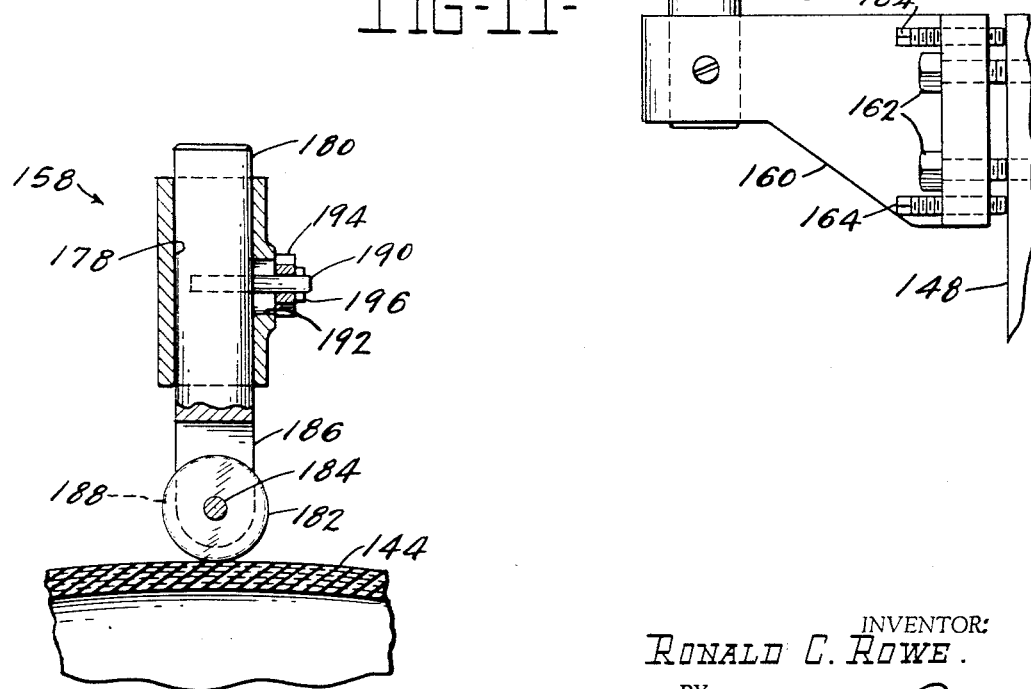
FIG-12-

1

3,411,975
APPARATUS FOR RETREADING TIRES
Ronald C. Rowe, Muncie, Ind., assignor to Bacon American Corporation, Muncie, Ind., a corporation of Indiana
Filed Sept. 11, 1964, Ser. No. 395,834
12 Claims. (Cl. 156—405)

This invention relates to apparatus for handling rubber stock and specifically for apply retreading stock to a tire body or casing which forms the basic structure for a retreaded tire.

The present invention is concerned with that portion of a retreading process in which the tread stock is dispensed from a supply, measured, and applied to the periphery of a prepared tire casing. In apparatus for accomplishing this, the tread stock is removed from the source of supply and laid out generally horizontally, after which a strip of the tread stock of predetermined length is cut from the laid-out piece. A forward end of the stock is then placed in contact with the prepared tire casing, with a tacky surface of the stock contacting the casing. The casing is then rotated in a direction such that the strip is wound therearound while being closely guided and directed so as to make certain that the stock will be applied symmetrically and in a straight line without waver. The tread stock strip also is preferably fully supported up to the point at which it contacts and is applied to the tire casing, to prevent the possibility of stretching or attenuation of the stock between the tire and the last point at which it is supported. The strip also is applied under uniform pressure and is moved with a uniform force to assure that any small attenuation of the strip will be uniform.

The casings to which the tread stock strips are to be applied are controlled to uniform diameters and circumferences prior to the application of the tread strips. This can be accomplished by placing the tires under internal air pressure and moving the tire beads toward and away from one another to change the diameter and circumference as taught in a co-pending application of Carlton Keith Barefoot, Serial No. 393,001, filed Aug. 24, 1964. The diameter and the circumference of the tire casing thereby are regulated to accept a predetermined length of the tread stock, rather than cutting the stock to fit the tire casing, as has hereofore been the practice.

It is important that the tread stock strip be properly centered with respect to the tire casing and maintained in alignment therewith prior to and during the time in which the strip is being stitched to the casing. Toward this purpose, the present invention provides adjustable means for centering the supply of tread stock with respect to the apparatus and also provides adjustable means for maintaining the strip centered and aligned with the tire casing close to the point at which it is actually applied to the casing. Because the width of the tread stock used to retread a tire will vary for different sizes of tire casings, it is important that both the centering means for the supply of tread stock and the means for centering and aligning the strip be easily adjustable to accommodate the different widths. It is important that these centering and guiding means be symmetrically adjustable so that the strip is maintained in alignment

2 with the casing as the centering and guiding means are moved toward and away from one another. The present invention also provides apparatus for accomplishing these objects.

The tread stock strip used in the retreading process is of unvulcanized rubber and is tacky and readily subject to deformation. Consequently, it is relatively difficult to cut the strip cleanly and to maintain the several portions apart after cutting. The present invention additionally provides cutting means which cuts the tread stock strip cleanly and maintains a separation between the severed ends.

The present invention also provides a more sensitive and more easily usable gauge by means of which the diameter or circumference of a tire casing to which a length of tread stock is to be applied is measured. The gauge provides improved means by which an indication is readily made when the actual tire diameter or circumference equals a preset value.

It is, therefore, a principal object of the invention to provide improved apparatus for applying retreading stock to a tire casing.

Another object of the invention is to provide apparatus for applying retreading stock to a tire casing, which apparatus has adjustable means for centering a supply of the tread stock.

A further object of the invention is to provide apparatus for applying tread stock to a tire casing, which apparatus has adjustable means for maintaining the tread stock straight and aligned with the center of the tire casing.

Still another object of the invention is to provide improved apparatus for applying tread stock to a tire casing, which apparatus has means for severing the tread stock cleanly and maintaining the severed portions separated.

Still a further object of the invention is to provide apparatus for applying tread stock to a tire casing, which apparatus has an improved gauge indicating the diameter or circumference of the casing to which the tread stock is to be applied.

Other objects and advantages of the invention will be apparent from the following detailed description of a preferred embodiment thereof, reference being made to the accompanying drawing, in which:

FIG. 1 is a perspective view of apparatus for handling and applying tread stock to a tire casing according to the invention;

FIG. 2 is a fragmentary plan view of the supply end of the apparatus shown in FIG. 1;

FIG. 3 is a view partly in elevation and partly in cross section taken along the line 3—3 of FIG. 2;

FIG. 4 is a transverse view taken along the line 4—4 of FIG. 3;

FIG. 5 is an enlarged view in longitudinal cross section taken through a severing station shown in FIG. 1;

FIG. 6 is a view in vertical cross section taken along the line 6—6 of FIG. 5;

FIG. 7 is an enlarged, detailed persepctive view of a portion of the apparatus shown in FIG. 5;

FIG. 8 is a fragmentary, plan view of the conveyor of FIG. 1, with conveyor rollers removed to expose means for adjusting guiding and centering rollers;

FIG. 9 is a view in transverse cross section taken along the line 9—9 of FIG. 8;

FIG. 10 is a perspective view from the bottom of means for moving the adjusting means for the guiding and centering rollers;

FIG. 11 is a fragmentary end view in elevation taken from the stock applying end of the apparatus of FIG. 1; and FIG. 12 is a vertical view partly in cross section taken along the line 12—12 of FIG. 11.

Referring to FIG. 1, the tread stock handling and applying apparatus according to the invention includes a supply station 20, a severing station 22, and a stock applying station 24. The stock is moved along a conveyor 26 from the station 20 through the severing station 22 to the applying station 24, then being severed at the station 22. The forward end of the severed strip is subsequently applied to and wound around a tire casing at the station 24 to be stitched in place. The casing with the applied strip is then placed in suitable vulcanizing apparatus to vulcanize the strip to the casing and thereby complete the retreading operation.

The supply station 20 (FIGS. 1-4) includes a pivoted supporting arm 28 which rotatably supports a supply roller 30 or an axle 31 for receiving a roll 32 of tread stock. The supporting arm 28 is pivotally mounted by means of a pivot rod 34 carried by a pair of parallel connecting legs 36 attached to the conveyor 26. The arm 28 can pivot rearwardly to enable a new one of the tread stock rolls 32 to be placed on the roller 30. The arm 28 is then swung to the forward position shown in FIGS. 1-3.

It is important that the roll 32 be centered with respect to the conveyor 26 in order that the tread stock will be properly moved and guided therealong. For this purpose, the roll 32 is engaged by two centering rollers 38 which are mounted on horizontally disposed axles 40 supported by bearing blocks 42. Each of the bearing blocks 42 includes a lower, smooth passage which receives a guide rod 44 and a threaded upper passage which threadedly receives a threaded rod 46. The rod 46 has symmetrical left and right hand threads on each side of the center line of the conveyor 26. The guide rod 44 and the threaded rod 46 are held by suitable brackets 48 affixed to the supply end of the conveyor with the threaded rod extending through one of the brackets 48 and being connected to an adjusting handle 50.

After the supply roll 32 is mounted on the supporting roller 30, the arm 28 is swung to the forward position with the roll 32 moved between the centering rollers 38. The rollers 38 are then moved toward one another, by rotating the handle 50, until they contact the sides of the roll. Since the rollers 38 are moved symmetrically by virtue of the left and right hand threads on the threaded rod 46, the centering rollers are always symmetrically located with respect to the longitudinal extent of the conveyor 26. Hence, when the rollers 38 contact the sides of the roll, the roll 32 will be symmetrically positioned with respect to the conveyor 26.

A strip 52 is unwound from the roll 32 and moved toward the severing station 22 along supporting rolls 54. The tread stock strip 52 includes a layer 56 (FIG. 5) of unvulcanized rubber and a cover 58 of a plastic film or the like.

Means for moving the strip 52 along the conveyor 26 constitutes part of the severing station 22. The moving means includes a knurled power roller 60 powered through a reducer 62 and a motor 64. When the roller 60 is driven in a clockwise direction, as shown in FIG. 4, it pulls the cover 58 away from the layer 56 upwardly between rollers 66 and moves the layer along the conveyor.

As the now-exposed layer 56 moves beyond the knurled roller 60, it moves through a cutter assembly indicated at 68 which is effective to cut the layer 56 into a severed strip 70 of predetermined length. The cutter assembly 68 includes a cold cutting blade 72 which is powered by a double-acting fluid motor or ram 74. The blade 72 is connected to a piston rod 76 affixed to a piston 78 in a cylinder 80 of the motor 74. The blade 72 is moved downwardly when power fluid such as air is supplied through an upper line 82 and vented from a lower line 84. Similarly, the knife blade 72 is raised when power fluid is supplied through the lower line 84 and vented from the upper line 82.

In accordance with the invention, the blade 72 moves against a hard plastic back-up member or roller 86 which is located substantially directly in the path of the blade and below the layer 56. The roller 86 preferably is made of a plastic such as nylon which provides a firm surface and yet will not dull the edge of the blade 72. The roller 86 is maintained in position by a pair of side retaining strips 88 which extend slightly above the center of the roller 86 to hold it in place. The retaining members 88 are fastened by screws 90 or the like to a positioning block 92. The block 92 preferably positions the back-up roller 86 above the plane of adjacent conveyor rollers 94 and 96 so that the layer 56 must bend slightly, as shown in FIG. 5, when moving over the roller 86. The curved path of the layer 56 along with the curved surface provided by the back-up roller 86 are effective to separate the severed portions of the strip after the blade 72 has been moved through a cutting stroke. Since the rubber in the layer 56 is tacky and deformable, it has a tendency to flow back and stick together after the blade 72 has severed it and has once again been raised. The tendency to flow together is enhanced by the fact that the strip 56 is under slight compression after it moves beyond the knurled rollers 60 and is pushed toward the station 24. This action particularly occurs when the severed strip 70 lies on the conveyor 26 for a period of time after the severing operation and before being applied to a tire carcass. With the curvde surface and the higher position of the member or roller 86, the ends of the strip tend to slide away from one another, down each side of the roller 86, after severing.

The retaining strips 88 can be sufficiently loose to enable the roller 86 to rotate somewhat as the strips move thereover and thereby present a new cutting surface for the blade 72 each time it is operated. Otherwise, the strips 88 can be periodically loosened and the roller 86 rotated slightly to present a new cutting surface. The backing member 86 need not be in the form of a roller as long as it has a curved upper surface. The roller, however, does enable a new surface to be periodically presented to the knife blade 72.

Beyond the cutting assembly 68, the stock moves over the supporting roller 96 and onto conveyor rollers 98 of the conveyor 26. The stock moves along the rollers 98 until it contacts a limit switch trip lever 100 (FIG. 1) at the end of the conveyor 26, which lever opens a switch in the electrical circuit to the drive motor 64, stopping the motor, and, hence, the stock. At this time, the fluid motor 74 can be operated to cause the blade 72 to descend and sever the layer 56, thereby forming the severed strip 70.

The layer 56 can be centered with respect to the cutter assembly 68 by a plurality of pairs of centering rollers 102 which are suspended from bearing blocks 104 mounted on a guide rod 106 and a threaded rod 108. The threaded rod 108 has symmetrical right and left hand threads to move the blocks and the rollers equal distances toward and away from one another in the same manner as the centering mechanism for the supply roll 32 of tread stock.

The cutter assembly 68, the power roller 60, and its drive means, and the associated rollers are all mounted on a single frame 110 which can be moved longitudinally of the conveyor to adjust the length of the severed strip 70.

It is essential that the strip 70 of tread stock be centered precisely and aligned with a tire casing when being applied thereto. For this purpose, a plurality of side guiding and centering rollers 112 (FIGS. 8–10) are located at suitable, spaced points along the conveyor 26 between the severing station 22 and the strip applying station 24. The last of the rollers 112 preferably are positioned closely to the tire casing so that they will guide the stock 70 up as close as possible to the point at which it is applied to the tire. A number of the rollers must be used to maintain proper alignment of the strip and they must also be adjustable to accommodate stock of different widths. The adjustment must be capable not only of symmetrically moving the rollers in and out with respect to the longitudinal axis of the conveyor, but preferably also of moving them in and out as a unit, since individual adjustment of the various rollers would be unnecessarily time consuming.

The adjustment mechanism shown in FIGS. 8–10 meets all these requirements. Accordingly, the rollers 112 are mounted on vertical axles 114 which are supported by upstanding brackets 116. The brackets 116 are sufficiently thin to extend upwardly between the conveyor rollers 98 to support the guide rollers 112 thereabove. Each of the rows of the brackets 116 on each side of the conveyor 26 is affixed to a respective mounting bar 118 which can be slidably supported on cross strips 120 (FIG. 8) or other suitable means.

For the purpose of moving the mounting bars in and out, two connecting links 122 are pivotally attached to each of the mounting bars 118 at spaced points therealong, as shown in FIG. 8. The inner ends of the connecting links 122 are pivotally attached to main drive links 124 which are affixed to vertical drive shafts 126 rotatably mounted in cross bar 128 suspended from the conveyor frame. A worm wheel 130 is attached to each of the drive shafts 126 below the cross bar 128. The worm wheels 130 are driven by worm gears 132 which are mounted on a common shaft 134 extending longitudinally of the conveyor and rotatably mounted in ears 136. A ratchet crank handle 138 is attached to one end of the shaft 134 and is accessible through a door 140 (FIG. 1) of the conveyor 26.

When the spacing between the opposed guide rollers 112 is to be changed, the door 140 simply is opened and the operator oscillates the ratchet crank handle 138 after setting a ratchet button 142 (FIG. 10) to rotate the worms 132 in a predetermined direction and thereby rotate the worm wheels 130. This turns the main link 124 and moves the connecting links 122 in or out. Similarly, the mounting bars 118, the brackets 116, and the guide rollers 112 are moved in and out symmetrically with respect to the longitudinal extent of the conveyor. Hence, simply by operating the single crank handle 138, all of the guide rollers 112 can be adjusted to symmetrical, predetermined positions.

With the strip 70 uncovered, cut to proper length, and centered on the conveyor, it is ready to be applied to a tire casing. Toward this end, a previously buffed tire casing 144, preferably with cement sprayed thereon, is mounted on tire bead engaging plates 146 (FIG. 1) which are supported by a housing or stand 148. The diameter of the prepared casing 144 is then adjusted as hereinafter described. The bead plates 146 are rotatably supported by the stand centrally over the end of the conveyor, above the trip lever 100. After the strip 70 has engaged the lever 100 and has subsequently been severed by the cutting assembly 68, the end of the conveyor 26 is raised to place the tacky surface of the strip 70 in contact with the periphery of the tire casing 144. This can be accomplished by any means such as a hydraulic ram 150, as discussed in more detail in a co-pending application of C. K. Barefoot, Ser. No. 391,450, filed Aug. 24, 1964.

After the strip 70 is placed in contact with the casing 144, the casing and the bead plates 146 are rotated in a counterclockwise direction, with the strip being forced into contact with the casing by an end pressure roller 152 and being guided therearound by slanted guide rollers 154.

After the strip 70 is placed in contact initially with the casing and initially adhered thereto, a final application of pressure is applied by a pair of generally elliptical stitching rollers 155 which are moved into contact with the casing and the strip by a foot-operated lever mechanism 156. The stitching rollers 155 apply the strip fully to the casing and render it ready for vulcanization.

Prior to the application of the strip to the casing, however, the casing is first adjusted to a circumference equal to the length of the strip 70, as determined by the position of the cutting assembly 68 and the distance from the blade 72 to the lever 100. This can be accomplished by moving the beads in or out, as discussed more fully in the aforesaid co-pending applications. The proper size for the tire is determined by an indicator or gauge 158 (FIGS 10 and 11). The gauge 158 includes a mounting bracket 160 which is affixed to the stand 148 at a predetermined distance above the mounting plates 146 by means of screws 162. The bracket 160 is adjusted to a level position by leveling screws 164 to maintain a supporting post 166 in a vertical position. A scale bar 168 is suitably affixed to the post 166 by a clamping ring 170 and is adjusted vertically on the post 166 to a position in which the scale on the bar 168 corresponds to the distance from the axis of the bead plates 146. The scale shown is intended to represent the diameter of a tire or twice the distance from the axis of the bead plates, but it can equally well represent the circumference of a tire or twice the distance from the bead plates times pi.

A gauge bracket 172 is rotatably mounted on the post 166 so that it can be swung out of the way whenever desired. However, the bracket 172 is maintained in a predetermined vertical position by a collar 174 which can be adjusted vertically on the post 166 and affixed thereto by a hand-controlled set screw 176. The collar 174 is adjusted to a predetermined vertical position by a pointer or arrow located opposite the scale on the bar 168.

The gauge bracket 172 has a vertically extending passage 178 therethrough located in a plane symmetrical and parallel to said bead plates. A feeler 180 is mounted for vertical movement in the passage 178 and has a tire-engaging portion or roller 182 rotatably mounted on an axle 184 held by a bifurcated lower end 186 of the feeler 180. As shown in FIG. 11, the roller 182 preferably has a groove 188 located centrally thereon so that the operator may visually align the groove with a centrally located white stripe or other distinguishing mark found on most tire stock, as the tire stock is wound on the carcass. An intermediate portion of the feeler 180 has a projection 190 extending through a slot 192 in the bracket 172 which communicates with the passage 178. A pointer 194 is pivotally mounted by a pin 196 on the bracket 172 at a point spaced from the projection 190 and has a bifurcated end or opening 198 which engages the projection 190 to cause the opposite end of the pointer 194 to move in a direction opposite to the movement of the projection 190. A sector-shaped scale 200 is formed on the bracket 172 and the pointer 194 points horizontally when the diameter or circumference of the tire casing 144, as sensed by the feeler 180, is the same as that indicated on the scale bar 168.

With the collar 174 set to the predetermined desired dimension, the operator simply swings the bracket 172 over the casing 144, when positioned on the beads and inflated, and then moves the beads in or out until the pointer 194 reaches the horizontal position. When in this position, the operator knows that the circumference of the tire casing 144 will equal the length of the cut strip 70. The strip 70 is then applied to the casing 144 with the ends of the strip then meeting, or substantially so, when the casing has been rotated through one revolution.

It will be seen that the gauge 158 can enable a very accurate dimension of the casing 144 to be achieved since the pointer 194 will swing through the entire scale in response to a variation in diameter of only about one-half Various modifications of the above described embodiment of the invention will be apparent to those skilled in the art, and it is to be understood that such modifications can be made without departing from the scope of the invention, if they are within the spirit and the tenor of the accompanying claims.

I claim:

1. In combination with apparatus for retreading tires including means for rotatably supporting a supply of tread stock, a conveyor having a plurality of rotatable conveyor rollers, means for moving a strip of the tread stock along said conveyor, means for cutting the strip, a pair of tire bead engaging plates, and a stand for supporting said bead plates, the improvement comprising means for centering the supply roll of tread stock with respect to said conveyor, said centering means comprising a pair of parallel, horizontally-disposed rollers, a bearing block rotatably supporting each of said horizontal rollers and having a smooth passage and a parallel, threaded passage therethrough, a guide rod extending through the smooth passages of said bearing blocks, a threaded rod threadedly engaged with the threaded passages of said bearing blocks, said rod having symmetrical right and left hand threads, bracket means at each end of said guide and threaded rods for supporting said rods from said conveyor and including means for rotatably supporting said threaded rod, a handle beyond one of said bracket means for rotating said screw and for moving said bearing blocks and said rollers toward and away from one another symmetrically about the center line of the conveyor, said strip cutting means including a cutting blade, means for moving said blade in a vertical path, a rigid plastic roller located in the path of said blade and transversely to said conveyor, supporting rollers located on each side of said plastic roller and below the plane of said plastic roller whereby the tread stock strip bends when moved over said plastic roller, means for rotatably supporting said plastic roller in the path of the blade, a plurality of pairs of guide rollers uniformly spaced along said conveyor between said cutting means and said bead plate stand, each of said guide rollers having a vertical axle, brackets extending upwardly between some of said conveyor rollers and supporting said vertical axles, two mounting bars extending parallelly to said conveyor and located below said conveyor rollers, said brackets being affixed to said bars, means for movably suppoting said bars, two connecting links pivotally attached to each of said bars at corresponding positions symmetrically of said conveyor, two main links between said bars and each having end portions pivotally connected to the ends of said connecting links opposite the ends connected to said bars, vertical drive shafts affixed to said main links, means for rotatably supporting said vertical drive shafts, a worm wheel affixed to each of said drive shafts, a horizontal drive shaft extending parallel to said conveyor, means for supporting said horizontal drive shaft, two worms on said horizontal drive shaft engaging said worm wheels, a ratchet handle on said horizontal drive shaft for rotating said horizontal drive shaft in either direction, a vertical post affixed to said stand and having a scale representing a function of the distance between the axis of said bead plates and the scale, a gauge bracket rotatably mounted on said post, a collar vertically movable on said post to adjust said gauge bracket vertically thereon and yet enable said bracket to rotate, means for attaching said collar to said post, said gauge bracket having a vertically extending passage therethrough located in a plane symmetrical and parallel to said bead plates and having a slot extending parallel to said passage, a feeler movably mounted in said vertical passage, a roller rotatably mounted on the lower end of said feeler, a projection affixed to said feeler and extending through said slot, a pointer having an end pivotally connected to said projection, and pivot means on said gauge bracket pivotally supporting said pointer, said gauge bracket having markings cooperating with said pointer to indicate when a dimension of a tire casing sensed by said feeler equals the designated dimension set on said scale.

2. In combination with apparatus for retreading tires including means or rotatably supporting a supply roll of tread stock, a conveyor having a plurality of rotatable conveyor rollers, means for moving a strip of the tread stock along said conveyor, means for cutting the strip, a pair of bead plates, and a stand for supporting said bead plates, the improvement comprising means for centering the supply roll of tread stock with respect to said conveyor, said centering means comprising a pair of parallel, horizontally-disposed rollers, a bearing block rotatably supporting each of said horizontal rollers and having a smooth passage and a parallel theraded passage therethrough, a guide rod extending through the smooth passages of said bearing blocks, a threaded rod threadedly engaged with the threaded passages of said bearing blocks, said rod having symmetrical right and left hand threads, bracket means at each end of said guide and threaded rods for supporting said rods from said conveyor and including means for rotatably supporting said threaded rod, and a handle beyond one of said bracket means for rotating said screw and for moving said bearing blocks and said rollers toward and away from one another symmetrically about the center line of the conveyor.

3. In combination with apparatus for retreating tires including means for rotatably supporting a supply of tread stock, a conveyor having a plurality of rotatable conveyor rollers, means for moving a strip of the tread stock along said conveyor, means for cutting the strip, a pair of bead plates, and a stand for supporting said bead plates, the improvement comprising said strip cutting means including a cutting blade, means for moving said blade in a vertical path, a plastic roller located in the path of said blade and transversely to said conveyor, supporting rollers located on each side of said plastic roller and below the plane of said plastic roller whereby the tread stock strip bends when moved over said plastic roller, and means for rotatably supporting said plastic roller in the path of the blade.

4. In combination with apparatus for retreading tires including means for rotatably supporting a supply of tread stock, a conveyor, means for moving a strip of the tread stock along said conveyor, and means for cutting the strip, the improvement comprising said strip cutting means including a cutting blade, means for moving said blade in a vertical path, a plastic roller located in the path of said blade and transversely to said conveyor, supporting rollers located on each side of said plastic roller and below the plane of said plastic roller whereby the tread stock strip bends when moved over said plastic roller, and means for supporting said plastic roller in the path of the blade.

5. In combination with aparatus for retreading tires including means for rotatably suppporting a supply of tread stock, a conveyor, means for moving a strip of the tread stock along said conveyor, and means for cutting the strip, the improvement comprising said strip cutting means including a cutting blade, means for moving said blade in a path, a plastic roller located in the path of said blade and transversely to said conveyor, means for supporting said plastic roller in the path of the blade, supporting means located on each side of said plastic roller and behind said plastic roller whereby the tread stock strip bends in the path of the blade when the strip is moved over said plastic roller.

6. In combination with apparatus for retreading tires including means for rotatably supporting a supply of tread stock, a conveyor having a plurality of rotatable conveyor rollers, means for moving a strip of the tread stock along said conveyor, means for cutting the strip, a pair of bead plates, and a stand for suporting said bead plates, the improvement comprising a plurality of pairs of guide rollers uniformly spaced along said conveyor between said cutting means and said bead plate stand, each of said guide rollers having a vertical axle, brackets extending upwardly between some of said conveyor rollers and supporting each of said vertical axles, two mounting bars extending parallelly to said conveyor and located below said conveyor rollers, said brackets being affixed to said bars, means for movably supporting said bars, two connecting links pivotally attached to each of said bars at corresponding positons symmetrically of said conveyor, two main links between said bars and each having end portions pivotally connected to the ends of said connecting links opposite the ends connected to said bars, vertical drive shafts affixed to said main links, means for rotatably supporting said vertical drive shafts, a worm wheel affixed to each of said drive shafts, a horizontal drive shaft extending parallel to said conveyor, means for supporting said horizontal drive shaft, two worms on said horizontal drive shaft engaging said worm wheels, and a ratchet handle on said horizontal drive shaft for rotating said horizontal drive shaft in either direction.

7. In combination with apparatus for retreading tires including means for rotatably supporting a supply of tread stock, a conveyor having a plurality of rotatable conveyor rollers, means for moving a strip of the tread stock along said conveyor, and means for cutting the strip, the improvement comprising a plurality of pairs of guide rollers uniformly spaced along said conveyor between said cutting means and said stock applying means, each of said guide rollers having a vertical axle, brackets extending upwardly between some of said conveyor rollers and supporting each of said vertical axles, two mounting bars extending parallelly to said conveyor and located below said conveyor rollers, said brackets being affixed to said bars, means for movably supporting said bars, two connecting links pivotally attached to each of said bars at corresponding positions symmetrically of said conveyor, two main links between said bars and each having end portions pivotally connected to the ends of said connecting links opposite the ends connected to said bars, vertical drive shafts affixed to said main links, and means for rotating said vertical shafts for moving said guide rollers symmetrically transversely of said conveyor.

8. In combination with apparatus for retreading tires including means for rotatably supporting a supply of tread stock, a conveyor, means for moving a strip of the tread stock along said conveyor, and means for cutting the strip, the improvement comprising a plurality of pairs of guide rollers uniformly spaced along said conveyor between said cutting means and said stock applying means, each of said guide rollers having a vertical axle, brackets extending upwardly and supporting each of said vertical axles above said conveyor, two mounting bars located below said conveyor, said brackets being affixed to said bars, means for movably supporting said bars, a first pair of connecting links pivotally attached to each of said bars at corresponding positions symmetrically of said conveyor, a second pair of connecting links pivotally attached to each of said bars at corresponding positions symmetrically of said conveyor, means connecting said connecting links of each of said pair, and means simultaneously operating each of said connecting means for moving said connecting means equal amounts to cause symmetrical movement of said bars toward and away from one another.

9. In combination with apparatus for retreading tires including means for rotatably supporting a supply of tread stock, a conveyor having a plurality of rotatable conveyor rollers, means for moving a strip of the tread stock along said conveyor, means for cutting the strip, a pair of bead plates, and a stand for supporting said bead plates, the improvement comprising a vertical post affixed to said stand and having a scale representing a function of the distance between the axis of said bead plates and the scale, a gauge bracket rotatably mounted on said post, a collar vertically movable on said post to adjust said bracket vertically thereon to a predetermined value on said scale and yet enable said bracket to rotate, means for attaching said collar to said post, said bracket having a vertically extending passage therethrough located in a plane symmetrical and parallel to said bead plates and having a slot extending parallel to said passage, a feeler movably mounted in said vertical passage, a roller rotatably mounted on the lower end of said feeler, a projection affixed to said feeler and extending through said slot, a pointer having an end pivotally connected to said projection, and pivot means on said bracket pivotally supporting said pointer, said bracket having markings cooperating with said pointer to indicate when a dimension of a tire casing sensed by said feeler equals the designated dimension set on said scale.

10. In combination with apparatus for retreading tires including means for rotatably supporting a supply of tread stock, a conveyor, means for moving a strip of the tread stock along said conveyor, means for cutting the strips, and a stand for supporting a tire casing, the improvement comprising a vertical post affixed to said stand and having a scale representing a function of the distance between the axis of said bead plates and the scale, a gauge bracket rotatably mounted on said post, a collar vertically movable on said post to adjust said bracket vertically thereon to a predetermined value on said scale and yet enable said bracket to rotate, means for attaching said collar to said post, said bracket having a vertically extending passage therethrough located in a plane symmetrical and parallel to said bead plates, a feeler movably mounted in said vertical passage, a projection affixed to said feeler, a pointer having an end pivotally connected to said projection, and pivot means on said bracket pivotally supporting said pointer, said bracket having markings cooperating with said pointer to indicate when a dimension of a tire casing sensed by said feeler equals the designated dimension set on said scale.

11. In combination with apparatus for retreading tires including means for rotatably supporting a supply of tread stock, a conveyor, means for moving a strip of the tread stock along said conveyor, means for cutting the strip, and a stand for supporting a tire casing, the improvement comprising a vertical post affixed to said stand and having a scale representing a function of the distance between the axis of said bead plates and the scale, a gauge bracket rotatably mounted on said post, means vertically movable on said post to adjust said bracket vertically thereon to a predetermined value on said scale, and yet enable said bracket to rotate, a feeler movably mounted in said bracket, a pointer having an end pivotally connected to said feeler, and pivot means on said bracket pivotally supporting said pointer, said bracket having markings cooperating with said pointer to indicate when a dimension of a tire casing sensed by said feeler equals the designated dimension set on said scale.

12. In combination with apparatus for retreading tires including means for rotatably supporting a supply of tread stock, a conveyor, means for moving a strip of the tread stock along said conveyor, means for cutting the strip, and a stand for supporting a tire casing, the improvement comprising a gauge bracket adjustably mounted on said stand and movable to a desired position as determined by an associated scale, a feeler movably mounted in said bracket, a pointer having an end pivotally connected to said feeler, and pivot means on said bracket pivotally supporting said pointer, said bracket having markings cooperating with said pointer to indicate when a dimension of a tire casing sensed by said feeler equals the designated dimension set on said scale.

(References on following page)

References Cited

UNITED STATES PATENTS

| | | | |
|---|---|---|---|
| 1,399,118 | 12/1921 | Hermann | 156—405 X |
| 1,867,370 | 7/1932 | Maynard | 156—405 |
| 1,918,320 | 7/1933 | Campbell | 156—405 X |
| 1,961,725 | 6/1934 | Abbott | 156—405 X |
| 2,039,532 | 5/1936 | Heston | 156—406 |
| 2,045,554 | 6/1936 | Heid | 156—406 X |
| 2,208,767 | 7/1940 | MacDonald et al. | 156—406 |
| 2,268,334 | 12/1941 | Hirsch | 156—406 X |
| 2,918,105 | 12/1959 | Harris | 156—406 X |
| 3,170,829 | 2/1965 | Batten | 156—405 |
| 3,251,722 | 5/1966 | Holman | 156—96 |

FOREIGN PATENTS

| | | |
|---|---|---|
| 1,321,240 | 2/1963 | France. |

EARL M. BERGERT, *Primary Examiner.*

CLIFTON B. COSBY, *Assistant Examiner.*